United States Patent
Fukano

(10) Patent No.: US 7,448,759 B2
(45) Date of Patent: Nov. 11, 2008

(54) PROJECTION EQUIPMENT AND A METHOD OF DRIVING A LIGHT SOURCE LAMP IN PROJECTION EQUIPMENT

(75) Inventor: Kazuyasu Fukano, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 512 days.

(21) Appl. No.: 11/176,099

(22) Filed: Jul. 7, 2005

(65) Prior Publication Data
US 2006/0012758 A1    Jan. 19, 2006

(30) Foreign Application Priority Data
Jul. 15, 2004    (JP)    ............................. 2004-208959

(51) Int. Cl.
  *G03B 21/26*    (2006.01)
  *G03B 21/18*    (2006.01)
  *G03B 21/20*    (2006.01)
  *G03B 21/00*    (2006.01)
  *H04N 5/74*    (2006.01)

(52) U.S. Cl. .............................. 353/85; 353/30; 353/52; 353/121; 348/748

(58) Field of Classification Search .................. 353/30, 353/69, 70, 85, 121, 122, 57, 58, 52, 54; 348/745, 748, 806; 352/140
See application file for complete search history.

(56) References Cited

U.S. PATENT DOCUMENTS

| RE36,060 | E | * | 1/1999 | Miyashita | .................... 348/748 |
| 7,108,375 | B2 | * | 9/2006 | Eguchi | ........................ 353/30 |

FOREIGN PATENT DOCUMENTS

| JP | 56-097999 A | 8/1981 |
| JP | 9-069394 A | 3/1997 |
| JP | 10-312888 A | 11/1998 |
| JP | 2003-005287 A | 1/2003 |

OTHER PUBLICATIONS

Japanese Office Action dated Jun. 3, 2008 and English translation thereof issued in counterpart Japanese Appln. No. 2004-208959.

* cited by examiner

*Primary Examiner*—Melissa Jan Koval
(74) *Attorney, Agent, or Firm*—Frishauf, Holtz, Goodman & Chick, P.C.

(57) ABSTRACT

A projection equipment is provided with a projection system, a memory unit for storing discrimination information which is used to judge whether or not a cooling operation of a light source lamp of the projection system has been finished in a normal manner at the time of a previous power-off operation, a key input unit for giving an instruction to execute a power-on operation, and a control unit adapted to use a timer unit for delaying a turn-on operation of the light source lamp by a predetermined time depending on the discrimination information stored in the memory unit at the time when the instruction to execute the power-on operation is given.

5 Claims, 4 Drawing Sheets

US 7,448,759 B2

PROJECTION EQUIPMENT AND A METHOD OF DRIVING A LIGHT SOURCE LAMP IN PROJECTION EQUIPMENT

BACKGROUND OF THE INVENTION

The present invention relates to a projection equipment in which a high-pressure discharge lamp such as a high-pressure mercury lamp is used as a light source lamp, and a method of driving the light source lamp in the projection equipment, and a program thereof.

In recent years, a technology has been proposed, which controls a release voltage for the purpose of preventing discharge at the root of electrode of the high-pressure discharge lamp used as the light source lamp in a projector equipment at the time of starting operation, whereby the release voltage does not rise even though an input voltage increases at the time of starting operation of the high-pressure discharge lamp, and whereby even through a glow discharge produced by starting pulses is released from the root of the cathode electrode of the high-pressure discharge lamp to an inner wall of the lamp tube, an arc transfer does not occur. As a result, damage to the lamp due to the discharge from the electrode root is prevented, and also optical displacement, as well as variations in a lamp voltage and change in color are avoided. For example, refer to Patent Document #1.

[Patent Document #1] Japanese Laid-open Patent Specification No. 1997-069394

The technology disclosed in the Patent Document #1 prevents discharge at the electrode root of the lamp and instantly turns on the lamp when the power is recovered from the accident where the high-pressure discharge lamp serving as the light source lamp is abruptly turned off due to some reasons, for example, where the lamp is abruptly turned off because the electric code is pulled out by mistake.

However, the high-pressure discharge lamp heated to more than some temperature cannot be always turned on again when the starting pulses are applied thereto, and even if a user tries to apply a necessary voltage to the lamp several times to turn on same, the high-pressure discharge lamp often fails to turn on. In this case, the electrodes of the high-pressure lamp deteriorates seriously and its operational lifetime decreases.

SUMMARY OF THE INVENTION

According to one aspect of the invention, there is provided a projection equipment which comprises a light source lamp for emitting light, a projection unit for generating an optical image using the light emitted from the light source lamp, and for projecting the generated optical image, a non-volatile memory unit for storing discrimination information which is used to judge whether or not a cooling operation of the light source lamp has been finished in a normal manner at the time of previous power-off operation, an instruction unit for giving an instruction of power-on operation, and a turn-on control unit for delaying turn-on driving operation of the light source lamp by a predetermined time depending on the discrimination information stored in the non-volatile memory unit for storing, when the instruction of power-on operation is given by the instruction unit.

Further, according to another aspect of the invention, there is provided a projection equipment which comprises a light source lamp for emitting light, a projection unit for generating an optical image using the light emitted from the light source lamp, and for projecting the generated optical image, an instruction unit for giving an instruction of power-on operation; a temperature detecting unit for detecting a temperature of the light source lamp in response to the instruction of power-on operation given by the instruction unit, and a turn-on control unit for delaying turn-on driving operation of the light source lamp by a predetermined time depending on the temperature of the light source lamp detected by the temperature detecting unit, when the instruction of power-on operation is given by the instruction unit.

Furthermore, according to still another aspect of the invention, there is provided a method of driving a light source lamp in a projection equipment, which comprises storing in a non-volatile manner discrimination information which is used to judge whether or not a cooling operation of the light source lamp has been finished in a normal manner at the time of previous power-off operation, giving an instruction of power-on operation, and delaying turn-on driving operation of the light source lamp by a predetermined time depending on the stored discrimination information when the instruction of power-on operation is given.

Further, according to other aspect of the invention, there is provided a method of driving a light source lamp in a projection equipment, which comprises giving an instruction of power-on operation, detecting a temperature of the light source lamp in response to the given instruction of power-on operation, and delaying turn-on driving operation of the light source lamp by a predetermined time depending on the detected temperature of the light source lamp.

DESCRIPTION OF THE PREFERRED EMBODIMENTS

An embodiment in which the present invention is applied to a projector apparatus will be described with reference to the accompanying drawings.

Figure 1:
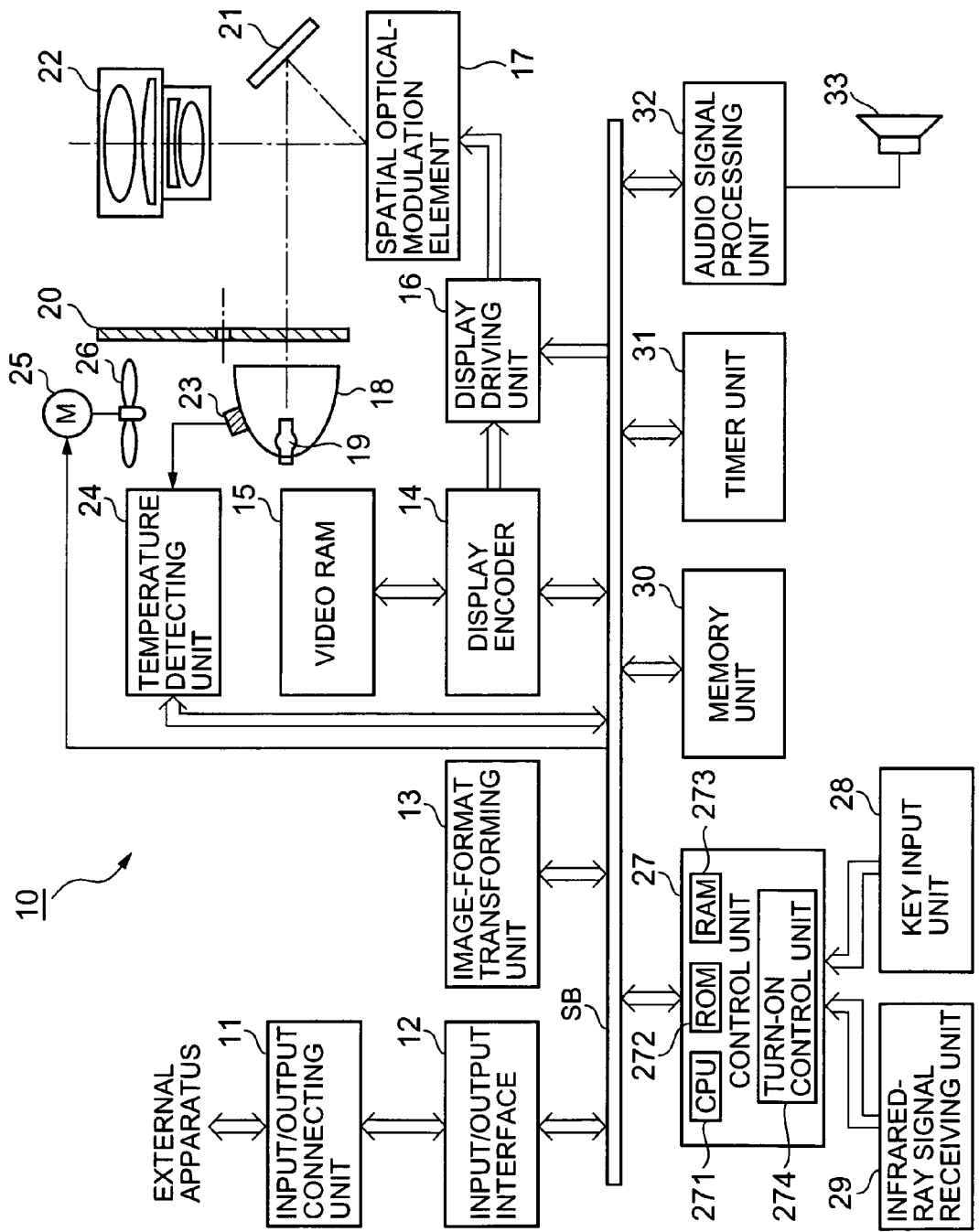
FIG. 1 is a block diagram illustrating a functional configuration of an electronic circuit in a projection equipment according to an embodiment of the present invention.

FIG. 1 is a view illustrating an electronic circuit configuration of the projector equipment 10. In FIG. 1, image signals in various formats are input from an external apparatus through an input/output connecting unit 11, and further transferred to an image-format transforming unit 13 through an input/output interface 12 and a system bus SB to be transformed into image signals of a predetermined format. The image signals of a predetermined format are supplied to a display encoder 14.

The display encoder 14 (projecting unit) loads and stores the supplied image signal in a video RAM 15 (projecting unit), and then generates a video signal based on contents stored in the video RAM 15 to output same to a display driving unit 16 (projecting unit).

The display driving unit 16 responds to the supplied image signal to drive a spatial optical-modulation element (SOM) 17 in a high-speed time-shearing driving manner based on a certain frame rate, such as, for example, 30 frames/sec. White light of high-intensity emitted from a light source lamp 19 such as an ultrahigh pressure mercury lamp equipped within a reflector 18 is colored into primary colors through a color wheel 20, and illuminated through a mirror 21 onto the spatial optical-modulation element (SOM) 17. Light reflected by the spatial optical-modulation element (SOM) 17 forms an optical image and the optical image thus formed is projected onto a screen (not shown) through a projector lens 22 (projecting unit) to be displayed thereon.

Meanwhile, a temperature sensor 23 is equipped in the vicinity of the light source lamp 19 of the reflector 18 to detect a temperature of the light source lamp 19, and the detected temperature is converted into digital data by a temperature detecting unit 24. The digital data is transferred through the system bus SB to a control unit 27, which will be described later in detail.

To cool down the light source lamp 19 in the reflector 18, there is provided a fan 26, which is driven by a motor 25 at a certain constant rotational speed, and the cooling air is guided to the reflector 18 and the light source lamp 19.

The control unit 27 controls operation of all of the circuits mentioned above. The control unit 27 comprises CPU 271, ROM 272 which stores an operation program to be executed in the projector equipment 10, RAM 273 or a work memory, and a turn-on control unit 274, which delays a turn-on driving operation by a certain delay time. The control unit 27 responses to a control instruction entered from the external apparatus through the input/output connecting unit 11, a key operation signal from a key input unit 28 (instructing unit) provided on the projector equipment 10, or contents of an infrared-ray signal which is sent in response to key operation of a remote controller (not shown) unique to the projector equipment 10 and received by an infrared-ray signal receiving unit 29 (instructing unit), and makes the circuits implement various operations.

The control unit 27 is connected through the system bus SB with a memory unit 30, a timer unit 31, and an audio signal processing unit 32.

The memory unit 30 (storage unit) comprises a non-volatile memory for temporarily storing various control information sent from the control unit 27, and the contents stored therein are read out in accordance with an instruction of the control unit 27.

A timer unit 31 implements a time counting operation to count a predetermined time in response to the instruction of the control unit 27.

An audio signal processing unit 32 is provided with a sound source circuit such as a PCM sound source, and serves to convert audio data given in an image projecting and displaying operation into an analog signal to drive a speaker 33, outputting sounds.

Now, operation of the above mentioned embodiment will be described in detail.

Figure 2:
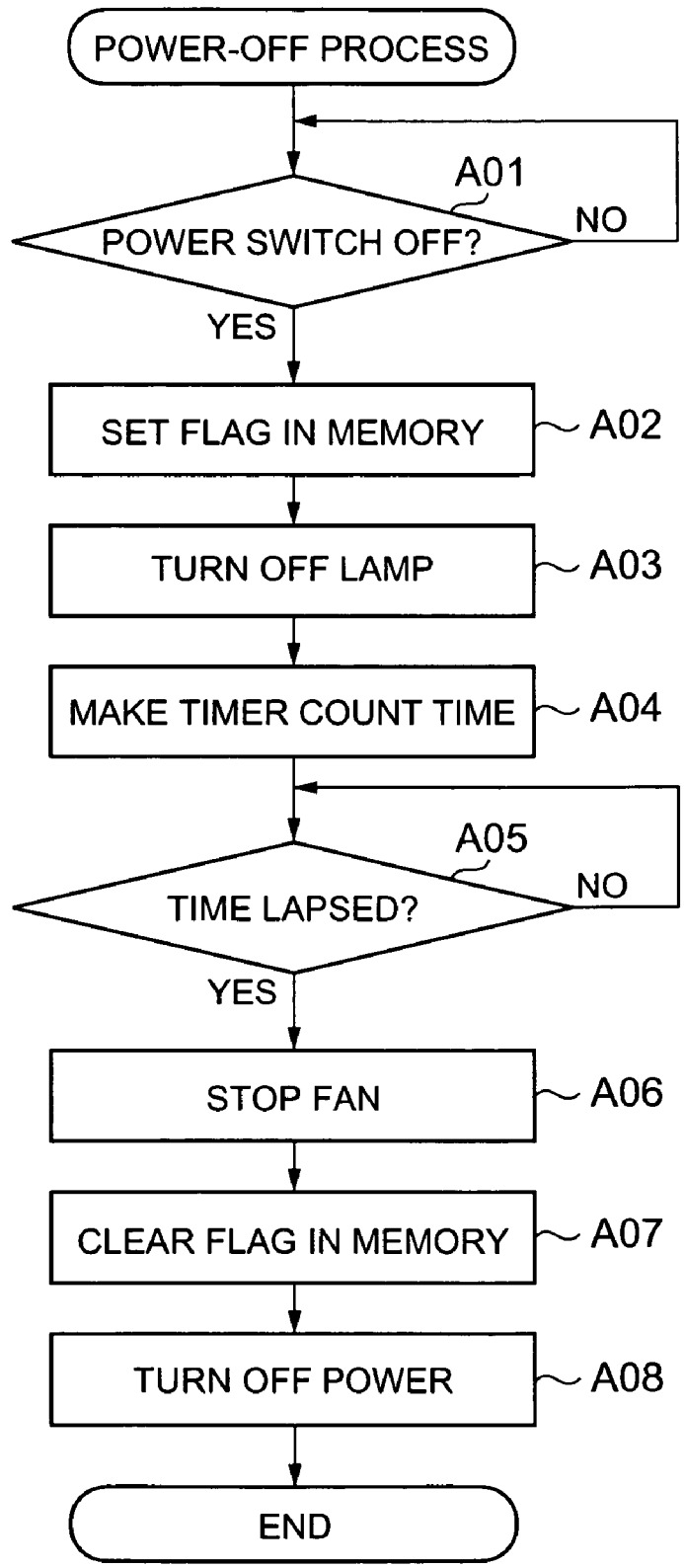
FIG. 2 is a flow chart of processes performed with respect to a light source lamp at the time of power-off operation in the embodiment of the invention.

FIG. 2 is a flowchart showing processes, which are executed by the control unit 27, when an instruction of turning off the power is given by operation of a power key provided in a key input unit 28, or when the infrared-ray signal receiving unit 29 receives a key operation signal for turning off the power from the remote controller (not shown) of the projector equipment 10. At the initial step, the control unit 27 is in a stand-by state, and waits for a power-off instruction at step A01. When the instruction of turning off the power is given, the control unit 27 confirms the instruction and sets at step A02 a flag in the memory unit 30, which flag represents that a process of turning off the power is being executed. Simultaneously at step A03, the control unit 27 sets the light source lamp 19 to be turned off, and makes a timer unit 31 start the time counting operation to count a predetermined time required to cool down the light source lamp 19, for example, a time of 5 minutes at step A04.

Thereafter, while the fan 26 keeps sending cooling air to the turned-off light source lamp 19, the control unit 27 repeatedly judges at step A05 whether the timer unit 31 has finished the time counting operation, until the predetermined time has lapsed.

When the control unit 27 determines that the predetermined time has lapsed, the control unit 27 also determines that the light source lamp 19 has been completely cooled down, and shuts off the power to the motor 25 to cease rotation of the fan 26 at step A06. Further, the control unit 27 clears at step A07 the flag representing that the process of shutting off the power to the memory unit 30 is being implemented. Then, the control unit 27 determines that the normal process in accordance with the instruction of shutting off the power has been finished, and turns off the power supplied to the entire projector equipment 10 at step A08.

Note that when the power is shut off at the timing before the flag set in the memory unit 30 is cleared at step A07, or when the power supply is abruptly shut off not because the instruction of turning off the power is given by operation of the power key but just because the electric cord is pulled out, the power is shut off with the flag set in the memory unit 30, which flag represents that the process for shutting off the power is being implemented.

Figure 3:
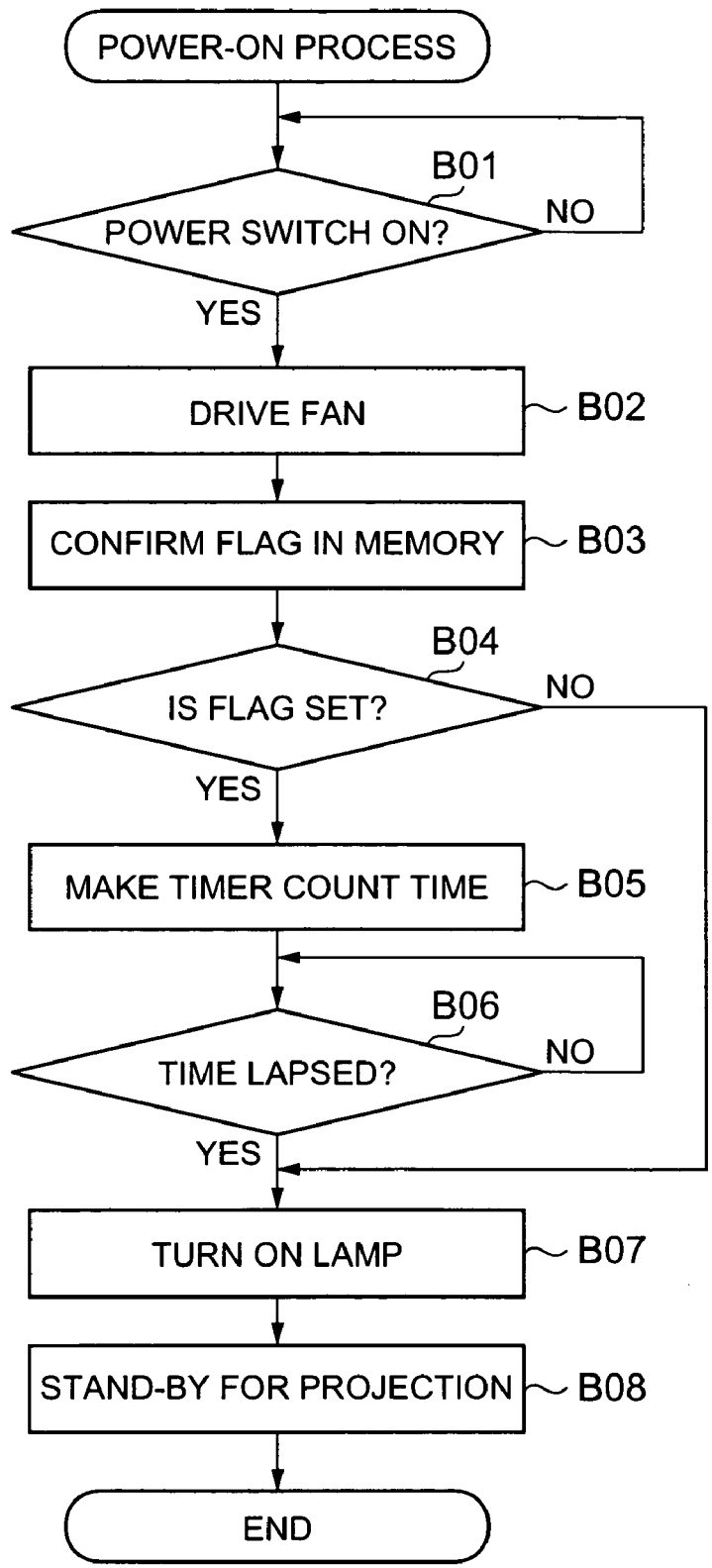
FIG. 3 is a flow chart of processes performed with respect to the light source lamp at the time of power-on operation in the embodiment of the invention.

FIG. 3 is a flow chart of a power-on process to be performed by the control unit 27. With reference to the flow chart of FIG. 3, operation will be described, which operation is performed when the instruction of turning on the power is given by operation of the power key provided in the key input unit 28 while the power is shut off in the projector equipment 10, or when the infrared-ray signal receiving unit 29 receives a key-operation signal instructing the power on from the remote controller (not shown) of the projector equipment 10.

At the initial step (step B01), the control unit 27 is in the stand-by state, waiting for the instruction of turning on the power.

When the instruction of turning on the power has been given, the control unit 27 confirms the instruction and makes the fan 26 rotate to send air to the light source lamp 19 at step B02. The control unit 27 confirms the contents of the memory unit 30 at step B03, and judges at step B04 whether the flag representing that the process for turning off the power is being implemented has been set or not.

When it is determined that the flag has not been set, no problem is created, but when it is determined that the flag has been set, the control unit 27 makes the timer unit 31 start counting a time required to cool down the light source lamp 19, for example, a time of 5 minutes at step B05, because the light source lamp 19 could not be completely cooled down because of an insufficient cooling time, when the power of the projector equipment 10 was shut down previously.

Thereafter, while the fan 26 keeps sending air to the light source lamp 19, the control unit 27 continues at step B06 to repeatedly judge whether the timer unit 31 has finished the time counting operation, until the predetermined time has lapsed.

When the control unit 27 determines that the predetermined time has lapsed, the control unit 27 also determines that the light source lamp 19 has been completely cooled down. Turning on the light source lamp 19 at step B07, the control unit 27 advances to a stand-by state at step B08 to implement an image projecting operation based on an image signal which is input to the input/output connecting unit 11 from an external apparatus. Having finished the process of FIG. 3 as described above, the control unit 27 advances to the image projecting operation and the stand-by state with the power turned off of FIG. 2.

As described above, the flag is stored as discrimination information in the memory unit 30, that is, in a non-volatile memory to judge whether cooling operation has been finished to cool down the light source lamp 19 without failure when the power is shut off. Therefore, when the power is turned on for the next time, the time for turning on the light source lamp 19 can be delayed by a certain time, if necessary, so as to turn on the light source lamp 19 after same has been sufficiently cooled down. As a result, deterioration of the light source lamp 19 or a high-pressure discharging lamp such as an ultrahigh pressure mercury lamp is prevented absolutely, and lifetime of an expensive high-pressure discharging lamp is lengthened, reducing the economic burden on a user.

In the process of FIG. 3, when it is determined that the flag representing that the process is being implemented to turn off the power has been set in the memory unit 30 when the power is turned on, the light source lamp 19 can be cooled down further for a predetermined time counted by the timer unit 31, even though the temperature of the light source lamp 19 has been actually decreased enough.

Therefore, the embodiment may be changed such that the temperature of the light source lamp 19 is measured precisely, and that the light source lamp 19 may be cooled down only when necessary.

Figure 4:
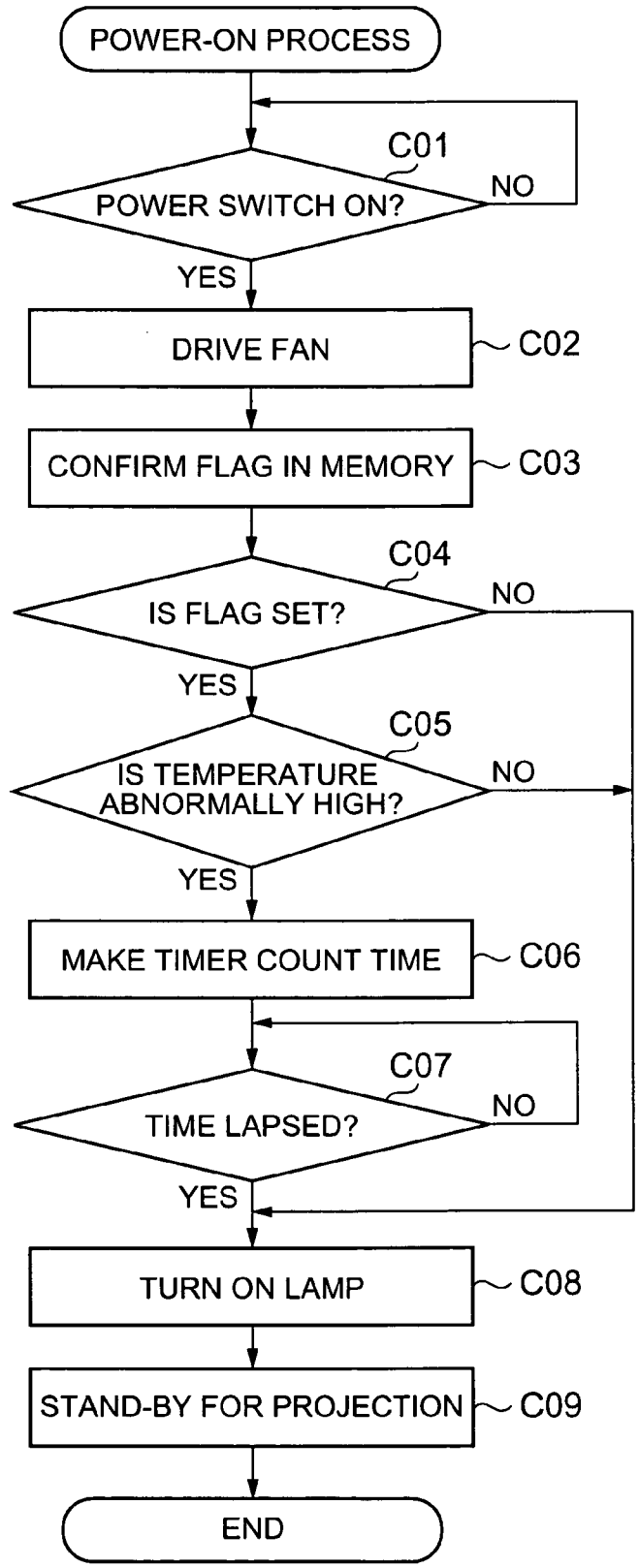
FIG. 4 is a flow chart of other processes performed with respect to the light source lamp at the time of power-on operation in the embodiment of the invention.

FIG. 4 is a flow chart of operation to be performed in a modified embodiment of the invention. The operation of FIG. 4 is performed in place of the operation of FIG. 3. The control unit 27 is in a stand-by state, waiting for an instruction of turning-on the power at step C01.

When the instruction of turning-on the power has been given, the control unit 27 confirms such instruction and makes the fan 26 rotate to send air to the light source lamp 19 at step C02. The control unit 27 confirms the contents of the memory unit 30 at step C03, and judges at step C04 whether the flag representing that the process for turning off the power is being implemented has been set or not.

When it is determined that the flag has not been set, no problem is created, but when it is determined that the flag has been set, the light source lamp 19 could not yet be cooled down completely because of the insufficient cooling time at the time when the power of the projector equipment 10 was previously shut down. Therefore, the control unit 27 makes a temperature sensor 23 in a temperature detecting unit 24 detect the temperature of the light source lamp 19 at step C05 to judge whether or not the detected temperature is abnormally high or so high that the cooling operation is necessary.

At this time, when it is determined that the temperature of the light source lamp 19 is not abnormal and sufficiently low, falling within the normal range, and that it is allowed to supply the power to the light source lamp 19 to turn on same, no problem is created. When it is determined that the light source lamp 19 remains in the temperature range in which it can not expected that the light source lamp 19 is turned on without failure and the light source lamp 19 can be deteriorated by failure in turning on the lamp, the timer unit 31 is caused at step C06 to start counting a time, for example, a time of 5 minutes, which is required to cool down the light source lamp 19. Thereafter, while the fan 26 keeps sending air to the light source lamp 19, the control unit 27 remains in the stand-by state until it is determined at step C07 that the timer unit 31 has finished the time counting operation.

When it is determined that the predetermined time has lapsed, the control unit 27 determines that the light source lamp 19 has been completely cooled down, and drives the light source lamp 19 to turn on at step C08, and enters into a stand-by state at step C09 for a projecting operation based on an image signal supplied to the input/output connecting unit 11 from an external device. Now, the control unit 27 has finished all the processes shown in FIG. 4, and enters into the projecting operation and the stand-by state of FIG. 2, where the power is off.

As described above, a flag is memorized in the memory unit 30 of anon-volatile memory, which flag is used as discrimination information for judging whether the cooling operation for the light source lamp 19 has been finished in a normal manner at the time of the power-off operation, whereby it is possible to judge whether the cooling operation has finished in the normal manner at the time of the previous power-off operation, when the power is turned on. Even if the power-off operation has not finished in the normal manner, only when it is determined that is actually necessary, the control unit 27 drives the light source lamp 19 again to turn on same after the predetermined time has lapsed and the light source lamp 19 has been sufficiently cooled down. As a result, deterioration of the light source lamp 19 or a high-pressure discharge lamp is prevented without failure, stretching the operation lifetime of the expensive high-pressure discharge lamp, and reducing economical burden of the user. When it is not necessary to wait for before the light source lamp 19 is turned on until the predetermined time has lapsed, the light source lamp 19 may be turned on without delay and it may be avoided to waste a time by spending the predetermined time before turning on the light source lamp 19.

In the above embodiment, an ultrahigh-pressure mercury lamp is used as the light source lamp 19, but the present invention is not limited to the use of the ultrahigh-pressure mercury lamp and other high-pressure discharge lamp may be employed as the light source lamp 19.

The predetermined time to be lapsed before the light source lamp 19 is turned on in the embodiments described above may be appropriately set depending on the type and heat capacity of the light source lamp 19 and the cooling capacity of the fan 26.

Although the present invention has been described and defined in detail with reference to the specific embodiments, many changes may be made within the scope of the invention as described and defined herein.

Further, in the embodiments described and defined above, inventions of various stages are involved, and various inventions may be derived from proper combinations of plural elements disclosed herein. For example, even if some elements are omitted in the entire configuration of the embodiment of the invention, and as far as at least one of the problems to be solved by the invention is solved, and also at least one of the effects of the present invention is realized, the configuration with the element omitted may be derived as the invention.

What is claimed is:

1. A projection equipment comprising:
   a light source lamp for emitting light;
   a projection unit for producing an optical image using the light emitted from the light source lamp, and for projecting the produced optical image;
   a cooling unit for performing a cooling operation to cool the light source lamp;
   a non-volatile memory unit for storing discrimination information indicating whether the cooling unit finished the cooling operation of cooling the light source lamp in a normal manner when a power-off operation was last performed to power off the equipment;
   an instruction unit for giving an instruction to execute a power-on operation to power on the equipment; and a turn-on control unit for, when the instruction unit gives the instruction to execute the power-on operation and when the discrimination information stored in the non-volatile memory unit indicates that the cooling unit did not finish the cooling operation in the normal manner when the power-off operation was last performed to power off the equipment, driving the cooling unit to perform the cooling operation to cool the light source lamp for a predetermined time before the light source lamp is turned on.

2. The projection equipment according to claim 1, wherein the instruction unit comprises a power key provided in a key input unit and a remote controller.

3. A projection equipment comprising:

a light source lamp for emitting light;

a projection unit for producing an optical image using the light emitted from the light source lamp, and for projecting the produced optical image;

a cooling unit for performing a cooling operation to cool the light source lamp;

a non-volatile memory unit for storing discrimination information indicating whether the cooling unit finished the cooling operation of cooling the light source lamp in a normal manner when a power-off operation was last performed to power off the equipment;

an instruction unit for giving an instruction to execute a power-on operation to power on the equipment;

a temperature detecting unit for detecting a temperature of the light source lamp; and a turn-on control unit for, when the instruction unit gives the instruction to execute the power-on operation and when the discrimination information stored in the non-volatile memory unit indicates that the cooling unit did not finish the cooling operation in the normal manner when the power-off operation was last performed to power off the equipment, controlling the temperature detecting unit to detect the temperature of the light source lamp and driving the cooling unit to perform the cooling operation to cool the light source lamp for a predetermined time before the light source lamp is turned on when the detected temperature of the light source lamp is above a predetermined level.

4. A method of driving a light source lamp in a projection equipment provided with a non-volatile memory and a cooling unit for performing a cooling operation to cool the light source lamp, said method comprising:

storing in the non-volatile memory discrimination information indicating whether the cooling unit finished the cooling operation of cooling the light source lamp in a normal manner when a power-off operation was last performed to power off the equipment;

giving an instruction to execute a power-on operation to power on the equipment; and driving the cooling unit to perform the cooling operation to cool the light source lamp for a predetermined time before the light source lamp is turned on when the instruction to execute the power-on operation is given and when the discrimination information stored in the non-volatile memory unit indicates that the cooling unit did not finish the cooling operation in the normal manner when the power-off operation was last performed to power off the equipment.

5. A method of driving a light source lamp in a projection equipment provided with a non-volatile memory and a cooling unit for performing a cooling operation to cool the light source lamp, said method comprising:

storing in the non-volatile memory discrimination information indicating whether the cooling unit finished the cooling operation of cooling the light source lamp in a normal manner when a power-off operation was last performed to power off the equipment;

giving an instruction to execute a power-on operation to power on the equipment;

detecting a temperature of the light source lamp when the instruction to execute the power-on operation is given and when the discrimination information stored in the non-volatile memory indicates that the cooling unit did not finish the cooling operation in the normal manner when the power-off operation was last performed to power off the equipment; and driving the cooling unit to perform the cooling operation to cool the light source lamp for a predetermined time before the light source lamp is turned on when the detected temperature of the light source lamp is above a predetermined level.

* * * * *